United States Patent
Laux et al.

(10) Patent No.: US 9,614,343 B2
(45) Date of Patent: Apr. 4, 2017

(54) DEVICE FOR AMPLIFYING A LASER PULSE HAVING IMPROVED TEMPORAL CONTRAST

(71) Applicant: THALES, Courbevoie (FR)

(72) Inventors: Sebastien Laux, Palaiseau (FR); Olivier Casagrande, Chaville (FR); Paul Jougla, Paris (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 14/439,603

(22) PCT Filed: Oct. 28, 2013

(86) PCT No.: PCT/EP2013/072478
§ 371 (c)(1),
(2) Date: Apr. 29, 2015

(87) PCT Pub. No.: WO2014/067888
PCT Pub. Date: May 8, 2014

(65) Prior Publication Data
US 2015/0303642 A1    Oct. 22, 2015

(30) Foreign Application Priority Data
Oct. 31, 2012 (FR) ................................. 12 02935

(51) Int. Cl.
*H01S 3/042* (2006.01)
*H01S 3/06* (2006.01)
(Continued)

(52) U.S. Cl.
CPC ............ *H01S 3/042* (2013.01); *H01S 3/0071* (2013.01); *H01S 3/0602* (2013.01);
(Continued)

(58) Field of Classification Search
CPC ...... H01S 3/042; H01S 3/0071; H01S 3/0602; H01S 3/0604; H01S 3/0615
See application file for complete search history.

(56) References Cited

U.S. PATENT DOCUMENTS

| | | | |
|---|---|---|---|
| 6,834,064 B1 * | 12/2004 | Paschotta | H01S 3/081 372/11 |
| 2002/0118721 A1 * | 8/2002 | Bittenson | G02B 27/14 372/100 |

(Continued)

FOREIGN PATENT DOCUMENTS

| | | |
|---|---|---|
| DE | 102004009593 A1 | 9/2005 |
| WO | 0143242 A1 | 6/2001 |
| WO | 2006081175 A2 | 8/2006 |

OTHER PUBLICATIONS

R. L. Fork et al., "Negative dispersion using pairs of prisms", Optics Letters, vol. 9, 150-152, 1984.*

*Primary Examiner* — Eric Bolda
(74) *Attorney, Agent, or Firm* — Baker & Hostetler LLP

(57) ABSTRACT

A device for amplifying a multi-wavelength pulsed laser beam is provided, which comprises: a solid amplifying medium with two planer faces, a front face and a reflecting rear face; and a device for cooling the amplifying medium by the rear face. The front face of the amplifying medium is tilted relative to its rear face by a first non-zero tilt and the device further comprises a trapezoidal prism, with an input face and an output face which form between them a second non-zero tilt, the first and second tilts being such that the beams of each wavelength are parallel to one another at the output of the prism.

9 Claims, 2 Drawing Sheets

(51) Int. Cl.
*H01S 3/08* (2006.01)
*H01S 3/081* (2006.01)
*H01S 3/00* (2006.01)

(52) U.S. Cl.
CPC .......... *H01S 3/0604* (2013.01); *H01S 3/0615* (2013.01); *H01S 3/0623* (2013.01); *H01S 3/0064* (2013.01); *H01S 3/0813* (2013.01)

(56) References Cited

U.S. PATENT DOCUMENTS

| | | | |
|---|---|---|---|
| 2003/0012230 A1* | 1/2003 | Hopkins | H01S 5/141 372/20 |
| 2006/0153257 A1* | 7/2006 | Franjic | H01S 3/042 372/34 |
| 2006/0176926 A1 | 8/2006 | Ludewigt et al. | |
| 2006/0193358 A1* | 8/2006 | Alfano | C30B 19/00 372/41 |

* cited by examiner

DEVICE FOR AMPLIFYING A LASER PULSE HAVING IMPROVED TEMPORAL CONTRAST

CROSS-REFERENCE TO RELATED APPLICATIONS

This application is a National Stage of International patent application PCT/EP2013/072478, filed on Oct. 28, 2013, which claims priority to foreign French patent application No. FR 1202935, filed on Oct. 31, 2012, the disclosures of which are incorporated by reference in their entirety.

FIELD OF THE INVENTION

The field of the invention is that of the solid state laser sources for scientific, industrial, medical and military applications. More specifically, it is used very advantageously for amplifying medium materials (such as a crystal) which have a relatively small thickness, compared to their aperture along the axis of propagation of the laser beam, typically less than 1:3.

BACKGROUND

The technology of pumping lasers has evolved substantially in recent years and it is now becoming possible to have a pulsed laser source which gives an average pumping power in the order of a hundred or so watts and a thermal deposition in the crystal of the same order of magnitude.

Various solutions have been implemented to resolve the problem of extraction of the thermal energy in the crystal:
  either the crystal is cooled in a conventional manner by a circulation of water on its periphery which is an effective solution but does not make it possible to produce systems operating at a hundred or so watts and above,
  or the crystal is cooled by using a cryogenic system which increases the thermal conductivity of the crystal to enhance the cooling thereof and reduce the focusing effects linked to the thermal charge in the crystal induced by the optical pumping.

These configurations exhibit drawbacks, notably in terms of costs, footprint and vibrations.

In the lasers of high average power (>10 watts), these solutions are not satisfactory and a rear face cooling is used.

An exemplary multipass amplification device configuration implementing a cooling of the amplifying medium 1 by a rear cooling (illustrated by the arrow) is illustrated in FIGS. 1a and 1b. The beam to be amplified 2 arrives on the amplifying medium 1 with an angle of incidence $\phi_i$ according to the front view (FIG. 1a) and $\theta_i$ according to the view from above (FIG. 1b). This device is multipass by virtue of the fact that the beam 2 passes several times through the amplifying medium 1 by virtue of the mirrors 3. The rear face 11 of the amplifying medium is reflecting to reflect the beam toward the amplifying medium. The amplified beam 6 leaves in the direction Oy, and can be seen only in FIG. 1a. In these figures, the beam is represented by a single ray.

The cooling can be obtained by means of a fluid, liquid or gas, or a solid. This cooling by the rear face makes it possible to increase the heat exchange surface area. Moreover, it makes it possible to generate a thermal gradient in the direction of propagation of the laser in the crystal, and thus to achieve a high thermal extraction. The index variations linked to the temperature variations in the crystal are gradients mostly oriented in the same direction as the direction of propagation of the laser beam. However, there then arises a problem of temporal contrast which was not encountered in the preceding solutions. The temporal contrast is defined by the ratio between the intensity of the main pulse and the foot of the pulse and/or any parasitic pulses.

Consequently, there is still, today, a need for an amplification device that simultaneously gives satisfaction to all the abovementioned requirements, in terms of cooling and of temporal contrast.

SUMMARY OF THE INVENTION

More specifically, the subject of the invention is a device for amplifying a multi-wavelength pulsed laser beam, which comprises:
  a solid amplifying medium of refractive index $n_1$, with two planar faces, a front face intended to receive the so-called incident beam to be amplified and a reflecting rear face, and
  a device for cooling the amplifying medium by the rear face.

It is mainly characterized in that the front face of the medium is tilted relative to its rear face by a first non-zero tilt and in that it further comprises a trapezoidal prism of refractive index $n_2$, with an input face and an output face which form between them a second non-zero tilt, situated at a location intended to be on the path of the beam reflected by the rear face and refracted by the front face of the amplifying medium (that is to say the beam at the output of the amplifying medium after having passed through it, also called amplified beam), the first and second tilts being such that the beams of each wavelength are parallel to one another at the output of the prism.

Thus, after propagation in the amplifying medium, the parasitic reflections are separated spatially from the main pulse and the temporal contrast is no longer degraded by the parasitic reflections.

Preferably, $n_2 \gg (n_1-1)/v_1$, $v_1$ being the constringence of the amplifying medium. The aim of this is to preserve the multi-wavelength nature of the beam at the output of the prism.

According to a feature of the invention, the front face of the amplifying medium being intended to receive the incident beam and reflect a so-called parasitic beam, the prism is situated outside the path of this parasitic beam, that is to say at a distance from the amplifying medium where the parasitic beam is separated from the incident beam.

According to another feature of the invention, the front face of the amplifying medium can be anti-reflection coated. Optionally, a filtering screen is situated at a location intended to be on the path of the parasitic beam.

The amplifying medium is, for example, a crystal or a glass or a polymer.

The beam to be amplified typically has an average power greater than 10 W.

BRIEF DESCRIPTION OF THE DRAWINGS

Other features and advantages of the invention will become apparent on reading the following detailed description, given as a nonlimiting example and with reference to the attached drawings in which.

From one figure to another, the same elements are identified by the same references.

DETAILED DESCRIPTION

In the two amplification solutions described in the preamble, the laser beam to be amplified passes through the crystal by entering on one side and leaving on the other side, and the parasitic beam, because of the parasitic reflections at the air/crystal interfaces, then travels along a longer optical path. The pre-pulse contrast is then not degraded because the parasitic pulses (=parasitic beam) arrive after the main pulse (=amplified beam).

The laser amplification devices with cooling by the rear face require a geometrical folding of the beam because of the reflecting rear face, such that the output face of the crystal is the same as the input face, which means that the parasitic pulses (due to the parasitic reflections on the front face) are located ahead of the main pulse, consequently degrading the temporal contrast of the pulse.

To avoid this degradation, the air/crystal interface is modified to separate the main pulse and the parasitic pulses: a slight angle is given to the input face of the amplifying crystal, this input face thus forming a tilt with the rear face. Thus, after propagation, the parasitic pulses are separated spatially from the main pulse.

Figure 1A:
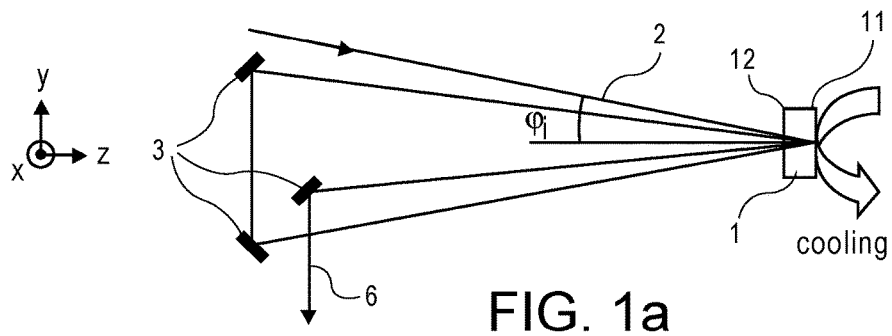
FIGS. 1a and 1b already described schematically represent a multipass amplification device with cooling by the rear face according to the prior art, seen from the front (FIG. 1a) and seen from above (FIG. 1b)
Figure 1B:
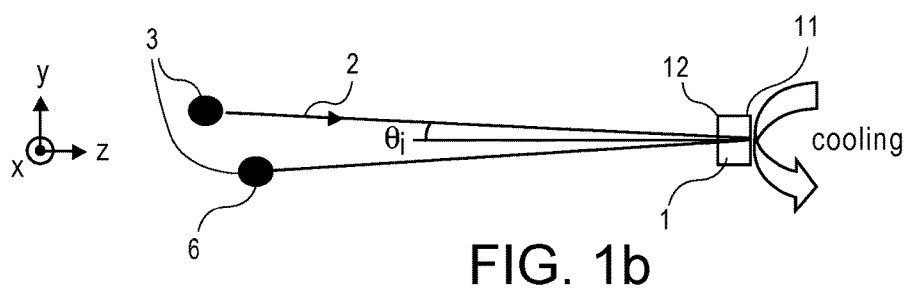
Figure 2A:
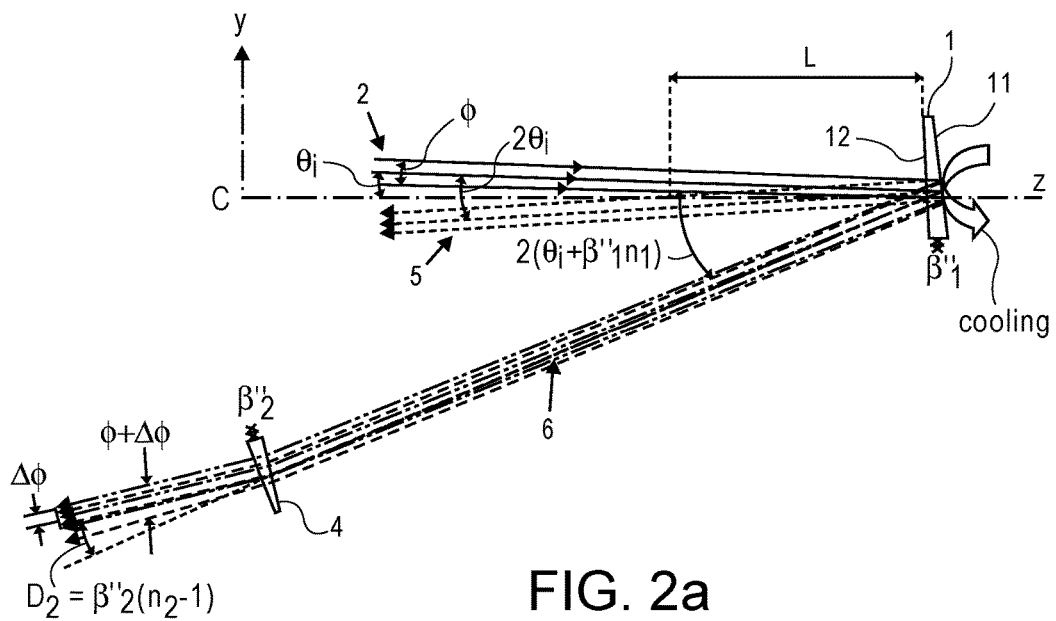
FIGS. 2a, 2b and 2c represent an exemplary amplification device with cooling by the rear face according to the invention, seen from the front (FIG. 2a), seen from above (FIG. 2b), and seen in perspective (FIG. 2c).
Figure 2B:
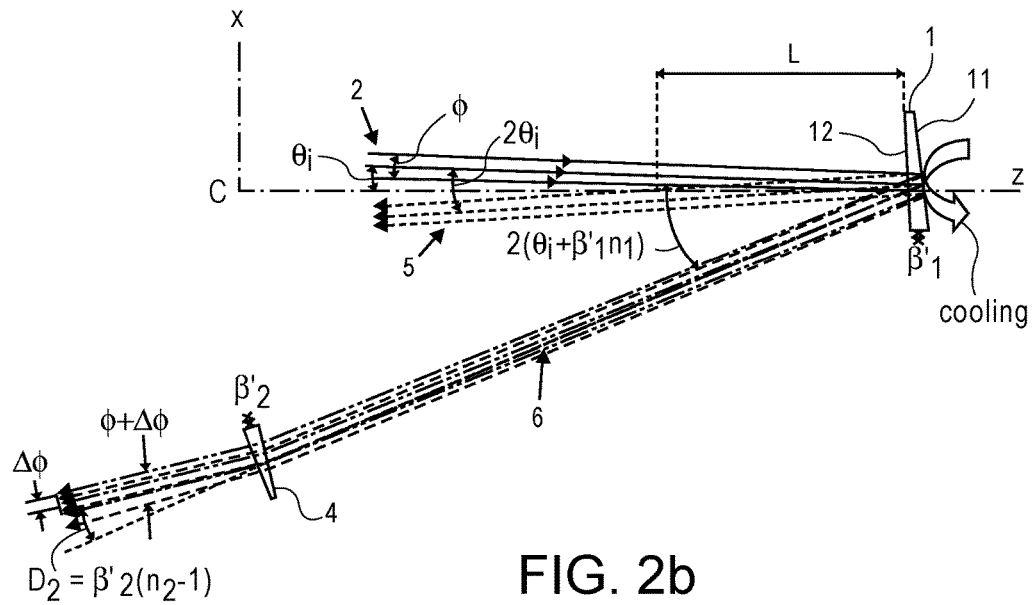

As can be seen in FIG. 2b which corresponds to the view from above of FIG. 1b but in which the mirrors have not been represented to avoid cluttering it, the beam (=the pulse) to be amplified 2 of diameter $\phi$ arrives on the amplifying medium 1 with an angle of incidence $\theta_i$ in the plane xOz on the front face 12 which is at right angles to Oz. The useful beam is reflected by the rear face 11, the parasitic beam 5 (dotted lines) by the front face 12: the parasitic beam, also called parasitic pulses, is deflected on this front face by an angle $2\theta_i$. The beam 6 amplified in the amplifying medium 1, also called main pulse, is deflected at the output by an angle $2\beta'_1 n_1$ with $n_1$ being the refractive index of the amplifying medium 1.

Similarly, as can be seen in FIG. 2a which corresponds to the view from above of FIG. 1a, the beam to be amplified 2 of diameter $\phi$ arrives on the amplifying medium 1 with an angle of incidence $\phi_i$ in the plane yOz on the front face 12 which is at right angles to Oz. The useful beam is reflected by the rear face 11, the parasitic beam 5 (dotted lines) by the front face 12; the parasitic beam is deflected on this front face by an angle $2\phi_i$. The amplified beam 6 is deflected at the output by an angle $2\beta''_1 n_1$. In these figures, $\beta''_1=\beta'_1$ and $\beta''_2=\beta'_2$.

Figure 2C:
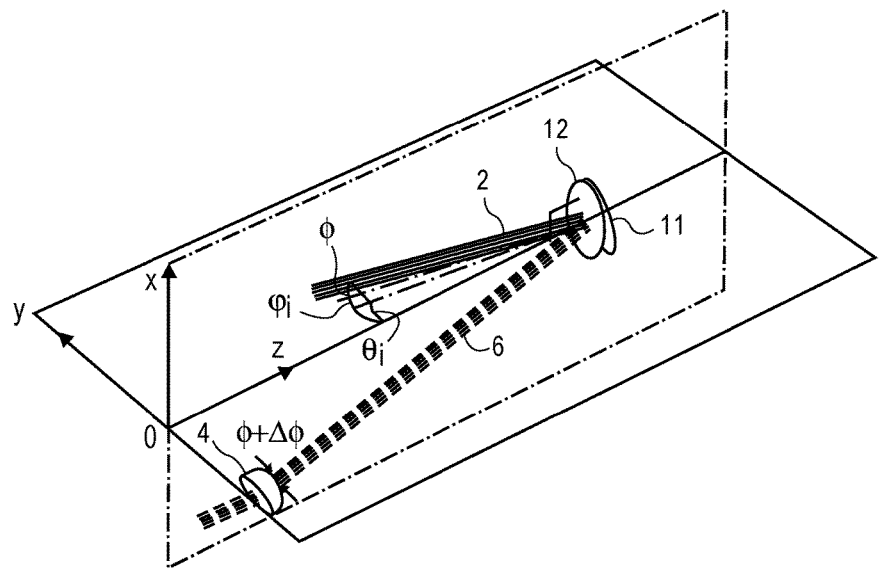

FIG. 2c is a perspective view of the device of FIGS. 2a and 2b in which the parasitic beam has not been shown.

Since it concerns a multi-wavelength laser source, the angle $\beta'_1$ (respectively $\beta''_1$) that the faces 12 and 11 form in the plane xOz (respectively, the plane yOz), produces a prismatic effect which, after passage through the amplifying medium 1, produces an angular separation of the main pulse 6 as a function of each of its wavelengths. In FIGS. 2a, 2b and 2c, two wavelengths are represented. A compensating prism 4 is then added after the separation of the main pulse 6 and of the parasitic pulses 5, on the path of the main pulse 6, to correct this spatial dispersion as a function of the wavelengths.

So that, at the output of the prism 4, the beams of each wavelength are parallel to one another, there is the following condition of achromatization between the angle $\beta'_1$ (respectively $\beta''_1$) of the faces of the amplifying medium 1 and the angle $\beta'_2$ (respectively $\beta''_2$) of the faces of the compensation prism 4:

$(2\beta'_1 \Delta n_1)=(\beta'_2 \Delta n_2)$ and respectively $(2\beta''_1 \Delta n_1)=(\beta''_2 \Delta n_2)$ with $$\Delta n_i = \frac{(n_i - 1)}{v_i} \text{ and } v_i = \frac{n_i(\lambda_c) - 1}{n_i(\lambda_{max}) - n_i(\lambda_{min})}$$

with $v_i$ being the constringence, $\lambda_c$ the central wavelength, $\lambda_{min}$ and $\lambda_{max}$ being the spectral limits of the incident beam 2, and $n_2$ being the refractive index of the prism 4.

In these formulae, it is assumed that the beams are propagated in air or vacuum.

The front face 12 of the amplifying medium is advantageously anti-reflection coated. There can nevertheless remain a residue.

Preferably, the prism 4 is arranged at a distance L from the amplifying medium 1, where the parasitic beam 5 and the incident beam 2 are spatially separated, that is to say do not exhibit any overlap between them. More specifically, L is the distance between the prism and the amplifying medium, projected onto the axis Oz at right angles to the face 12 of the prism 1.

This separation is obtained for L such that:

$L>\phi/\tan(2\theta_i)$ and $L>\phi/\tan(2\phi_i)$.

Preferably also, L is chosen such that the amplified beam 6 and the parasitic beam 5 are spatially separated. The plane xOz is then preferentially used to "eject" the parasitic pulses with therefore $\beta''_1=0$. The projection $\beta'_1$ of the angle $\beta_1$ in the plane xOz is equal to $\beta_1$ whereas the projection $\beta''_1$ of the angle $\beta_1$ in the plane yOz is zero. It is then possible to choose a zero angle of incidence ($\theta_i=0$) as in the numerical example below.

The prism 4 must of course not mask the incident beam 2. Preferably also, L is chosen such that the amplified beam 6, incident beam 2 and parasitic beams 5 are spatially separated. This separation is obtained for L such that:

$L>\phi/\tan(2(\theta_i+\beta'_1 n_1))$ or $L>\phi/\tan(2(\phi_i+\beta''_1 n_1))$.

On the prism 4, the spectral components of the incident beam 6 form a spot of diameter $\phi+\Delta\phi$. It will be noted that $\Delta\phi$ includes the increase in the diameter introduced by the divergence of the beam in the double passage through the prism 1 then that introduced by the divergence of the beam on the path between the output face 12 of the prism 1 and the prism 4; the same diameter $\phi+\Delta\phi$ is obtained at the output of this correcting prism 4. To preserve the multi-wavelength nature of the output beam, it is desired for the widening $\Delta\phi$ of the diameter of the amplified beam 6 to be small compared to $\phi$.

Such is the case because:

$$\Delta\phi = L \cdot \tan(2\beta_1 \Delta n_1) = L \cdot \tan\left(2\beta_1 \frac{1}{v_1}(n_1 - 1)\right)$$

Now, the following still applies $$(2(\theta_i + \beta_1 n_1)) \gg 2\beta_1 \frac{1}{v_1}(n_1 - 1)$$

because $n_1 >> (n_1-1)/v_1$, which means that $\Delta\phi << \phi$.

For the case, for example, of a sapphire crystal doped with titanium ions Ti3+, the following apply:
$\lambda_{min}$=750 nm
$\lambda_{max}$=850 nm
$v_1$=244
$n_1$=1.76
$\beta_1=\beta'_1=\beta''_1=1°$
$\theta_i=\phi_i=0°$
$L_{min}=\phi/\tan(2\cdot(\theta_i+\beta_1 n_1))$, $L_{min}$ being the minimum distance L.

The widening $\Delta\phi$ of the beam amplified over the 750 nm to 850 nm band has the value:

$$\Delta\phi = L_{min} \cdot \tan(2\beta_1 \Delta n_1) \approx L_{min} \cdot 10^{-4},$$

to be compared with $$\phi = L_{min} \cdot \tan(2\cdot(\theta_i+\beta_1 n_1)) \approx L_{min} \cdot 6 \cdot 10^{-2}.$$

The following is then obtained:

$$\Delta\phi/\phi \approx 0.16 \cdot 10^{-2}.$$

After the correcting prism 4, the different wavelengths thus cease to be spatially separated. Given the optomechanical margins to be taken into account, the lateral shift $\Delta\phi$ is rather in the order of 1 tenth of the diameter $\phi$ of the amplified beam. The phenomenon is in any case negligible because $\Delta\phi << \phi$.

The beam to be amplified is typically an IR beam, without this being limiting.

As indicated in the examples, the amplifying medium 1 can be a crystal such as sapphire doped with titanium, or Yb:YAG, Yb:CaF2 or a polymer material, or a glass or any other material in the solid state. The material of the prism 4 can be the same as that of the amplifying medium 1; in this case $n_1=n_2$.

The amplification device according to the invention is preferably a multipass device, but not necessarily.

The invention claimed is:

1. A device for amplifying a multi-wavelength pulsed laser beam, comprising:
    a solid amplifying medium of refractive index $n_1$ for a first wavelength among wavelengths of said multi-wavelength pulsed laser beam, with two planar faces, a front face configured to receive the multi-wavelength pulsed laser beam to be amplified and a reflecting rear face, the front face being tilted relative to its rear face by a first non-zero tilt,
    a device for cooling the amplifying medium by the rear face, and a trapezoidal prism of refractive index $n_2$ for a second wavelength among wavelengths of said multi-wavelength pulsed laser beam, with an input face and an output face which form between them a second non-zero tilt, said trapezoidal prism being situated in a location on a path of the multi-wavelength pulsed laser beam reflected by the rear face and refracted by the front face of the amplifying medium, and the first and the second tilts being such that beams of each wavelength among wavelengths of said multi-wavelength pulsed laser beam are parallel to one another at the output of the trapezoidal prism.

2. The device for amplifying a multi-wavelength pulsed laser beam as claimed in claim 1, wherein, the front face of the amplifying medium being at right angles to an axis Oz, the first tilt forms an angle $\beta'_1$ on a plane yOz and $\beta''_1$ on a plane xOz, the second tilt forms an angle $\beta'_2$ on the plane yOz and $\beta''_2$ on the plane xOz, such that
$2\beta'_1 \Delta n_1 = \beta'_2 \Delta n_2$ and $2\beta''_1 \Delta n_1 = \beta''_2 \Delta n_2$.

3. The device for amplifying a multi-wavelength pulsed laser beam as claimed in claim 1, wherein $n_1 >> (n_1=1)/v_1$, $v_1$ being the constringence of the amplifying medium.

4. The device for amplifying a multi-wavelength pulsed laser beam as claimed in claim 1, wherein, the front face of the amplifying medium is configured to receive the incident beam and to reflect a parasitic beam, the trapezoidal prism is situated outside the path of the parasitic beam.

5. The device for amplifying a multi-wavelength pulsed laser beam as claimed in claim 1, wherein the front face of the amplifying medium is anti-reflection coated.

6. The device for amplifying a multi-wavelength pulsed laser beam as claimed in claim 1, wherein $n_1=n_2$.

7. The device for amplifying a multi-spectral pulsed laser beam as claimed in claim 1, further comprising a filtering screen situated in a location intended to be on the path of the beam reflected by the front face of the amplifying medium.

8. The device for amplifying a multi-spectral pulsed laser beam as claimed in claim 1, wherein the amplifying medium is one of: a crystal, a glass, or a polymer.

9. The device for amplifying a multi-spectral pulsed laser beam as claimed in claim 1, wherein an energy per pulse is greater than 1 mJ, and an average power is greater than 10 W.

* * * * *